(12) United States Patent
Sobol et al.

(10) Patent No.: US 11,401,190 B2
(45) Date of Patent: Aug. 2, 2022

(54) MOLD, AND APPARATUS FOR FORMING GLASS PRODUCT, AND METHOD OF PROCESSING GLASS PRODUCT

(71) Applicant: AAC Optics Solutions Pte. Ltd., Singapore (SG)

(72) Inventors: Michal Sobol, København (PL); Tsz Lok Keith Tang, Hong Kong (CN); Thomas Aabo, Albertslund (DK); Jacob Kibsgaard Kjær, Søborg (DK); Peter Krohne Nielsen, Hillerød (DK); Simon Bo Jensen, Hillerød (DK); Niels Christian Roemer Holme, Farum (DK); Bingke Zhu, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 215 days.

(21) Appl. No.: 16/810,877

(22) Filed: Mar. 6, 2020

(65) Prior Publication Data
US 2021/0214262 A1    Jul. 15, 2021

(30) Foreign Application Priority Data

Jan. 9, 2020 (CN) .................. 202010023193.8

(51) Int. Cl.
| C03B 9/36 | (2006.01) |
| C03B 9/38 | (2006.01) |
| C03B 17/04 | (2006.01) |
| C03B 11/08 | (2006.01) |
| C03B 40/00 | (2006.01) |

(52) U.S. Cl.
CPC .............. *C03B 11/08* (2013.01); *C03B 40/00* (2013.01); *C03B 2215/46* (2013.01); *C03B 2215/50* (2013.01); *C03B 2215/68* (2013.01)

(58) Field of Classification Search
CPC .................................................. C03B 2215/68
See application file for complete search history.

(56) References Cited

U.S. PATENT DOCUMENTS 10,934,203 B2 * 3/2021 Su ...................... C03B 23/0305

FOREIGN PATENT DOCUMENTS

| CN | 203496181 U | * | 3/2014 |
| CN | 105058721 A | * | 11/2015 |
| CN | 105437467 A | * | 3/2016 |
| CN | 105690625 A | * | 6/2016 |

(Continued)

*Primary Examiner* — Alison L Hindenlang
*Assistant Examiner* — Steven S Lee
(74) *Attorney, Agent, or Firm* — W&G Law Group

(57) ABSTRACT

A mold includes a mold component, a plurality of ejector pins and a stop block. The mold component has a molding surface for forming a glass product and a bottom surface disposed opposite to the molding surface. The mold component defines a plurality of passing through holes through the molding surface and the bottom surface. Each ejector pin passes movably through one corresponding through hole and is configured to separate the glass product from the mold component. The stop block for forming a stop on the ejector pins disposed on one side of the bottom surface. Separates the glass product from the mold component before the glass product is completely cooled down by using the combination of the ejector pins together with the stop block, which can make the cooling of the glass product more uniform.

7 Claims, 9 Drawing Sheets

(56) References Cited

FOREIGN PATENT DOCUMENTS

| | | | | | |
|---|---|---|---|---|---|
| CN | 106273253 A | * | 1/2017 | | |
| GB | 2518212 A | * | 3/2015 | ........... | C03B 11/082 |
| JP | H10259028 A | * | 9/1998 | ............. | C03B 11/08 |

* cited by examiner

MOLD, AND APPARATUS FOR FORMING GLASS PRODUCT, AND METHOD OF PROCESSING GLASS PRODUCT

TECHNICAL FIELD

The disclosure relates to formations of glass products, and more particularly to a mold and apparatus for forming a glass product, and a method of processing the glass product.

BACKGROUND

Lenses are optical elements made of transparent materials (such as glass, crystal, etc.), which can be widely used in security, vehicle, digital camera, laser, optical instruments, and other fields. With the continuous expansion of the market, the application of a lens is more and more extensive. Especially with the development of the Internet, various electronic devices are brought into daily lives, such as mobile phones, tablet computers, laptops, etc. Specification requirements of a lens applied in those electronic devices are also highly increased.

In the prior art, the wafer lenses made of glass materials are generally produced by a glass processing mold through thermoforming. When the glass processing mold is enclosed, cavities with a preset shape will be encircled inside the glass processing mold, the cavities can help shape the heated glass substrate, and then the glass substrate is cooled to form glass products with a preset shape. The glass product will be directly attached to a forming surface to cool due to gravity and sticking.

However, the processing of the glass processing mold in the prior art has the following problems:

Firstly, at the last step of the molding process, the glass product 301 may be stuck together with the feature points 303 (namely the site where the lens is formed) of the mold 302, or it may be stuck together with the mold at a random point 304 (namely any point of the forming surface) to form a point contact. As shown in FIG. 6, where an arrow represents the shrinkage direction of the glass product 301. Contacting area of the glass product 301 contacting with the mold 302 tends to cool faster for the mold is cooled, and it may cause an uneven shrinkage across the glass product 301, leading to a deformation of the glass product 301, as shown in FIG. 7.

Secondly, in the forming process, the glass product 301 shows a strong adhesion to the mold surface. Although adhesion will gradually reduce during the cooling process, it takes a long time for the glass product 301 to completely cool down that leads to an auto release, thus increasing the cost. Besides, if the adhesion is too strong, the glass product 301 tends to crack.

Thirdly, the mold 302 with large angle feature will increase the risk of breakage of the glass product 301 during the process of shrinkage, because the shrinkage rate of the glass product 301 during the cooling process is greater than that of the mold 302, and the large angle feature of the mold 302 will prevent the glass product 301 from freely shrinking in the horizontal direction. The larger the diameter of the glass product, the greater the impact. Because the thermal expansion coefficient of the glass product 301 is larger than that of the mold 302, the glass product 301 shrinks more, as shown in FIG. 8. Where an arrow indicates the shrinkage direction of the glass product 301 and the mold 302, when the strain caused by the shrinkage difference between the mold 302 and the glass product 301 goes beyond the strain that the glass product 301 can sustain, the glass product 301 will crack, as shown in FIG. 9.

Therefore, it is necessary to provide an improved mold to solve the above problems.

SUMMARY

One of the objectives of the disclosure is to provide mold that can make the glass product cool down evenly without preventing the natural shrinkage of the glass product.

One of the objectives of the disclosure is realized by adopting the following technical scheme:

A mold includes a mold component, a plurality of ejector pins and a stop block; the mold component has a molding surface for forming a glass product and a bottom surface disposed opposite to the molding surface; the plurality of ejector pins are configured to separate the glass product from the mold component; the stop block for forming a stop on the ejector pins disposed on one side of bottom surface; the mold component defines a plurality of through holes passing through one corresponding through hole and the bottom surface; and each ejector pin passes movably through each through hole.

Preferably, each ejector pin comprises a first portion, a second portion and a third portion connected to the first portion through the second portion; a diameter of the second portion is greater than that of the third portion; each through hole comprises a first hole extending from the molding surface toward the bottom surface, a second hole extending from the first hole toward the bottom surface and a third hole extending from the second hole toward the bottom surface; the first portion corresponds to the first hole, the second portion corresponds to the second hole, the third portion corresponds to the third hole.

Preferably, the diameter of the second portion is greater than that of the first portion.

Preferably, the mold component further comprises a mold core and a mold insert disposed on one side of the mold core away from the stop block; the molding surface is defined on one side of the surface of the mold insert away from the mold core, the bottom surface is defined on one side of the surface of the mold core away from the mold insert; the second hole and the third hole are defined on the mold core and the second hole is connected to the third hole to pass through the mold core, and the first hole is defined on the mold insert.

Preferably, a chamfer is formed on a flange of the first hole.

Preferably, the molding surface comprises a molding area and a blank area surrounding the molding area, and the plurality of through holes are spaced and surround the edges of the molding area.

The disclosure also provides a glass product forming apparatus, the glass product forming apparatus includes the above-mentioned mold and a driving mechanism configured to drive the mold component to move toward or away from the stop block.

Still, the disclosure also provides a method of processing the glass product, the method including:

providing the above-mentioned glass product forming apparatus and a glass substrate;

placing the glass substrate in the mold to form a glass product;

when a temperature of the glass product drops to a glass transition temperature, the ejector pins protrude from the molding surface and push the glass product away from the mold; and cooling the glass product.

Separates the glass product from the mold component before the glass product is completely cooled down by using the combination of the ejector pins together with the stop block, which can eliminate the influence caused by the difference in the thermal expansion between the glass product and the mold, thus making the cooling of the glass product more uniform. Furthermore, because the glass product does not contact the molding surface, any features that are present at the mold component won't be able to stop the natural shrinkage of the glass product. Besides, separates the glass product from the mold before the glass product fully cools down, thus the mold can mold the next glass substrate, which can greatly increase production efficiency and shorten the cycle time during production.

DETAILED DESCRIPTION OF THE PREFERRED EMBODIMENTS

Figure 1:
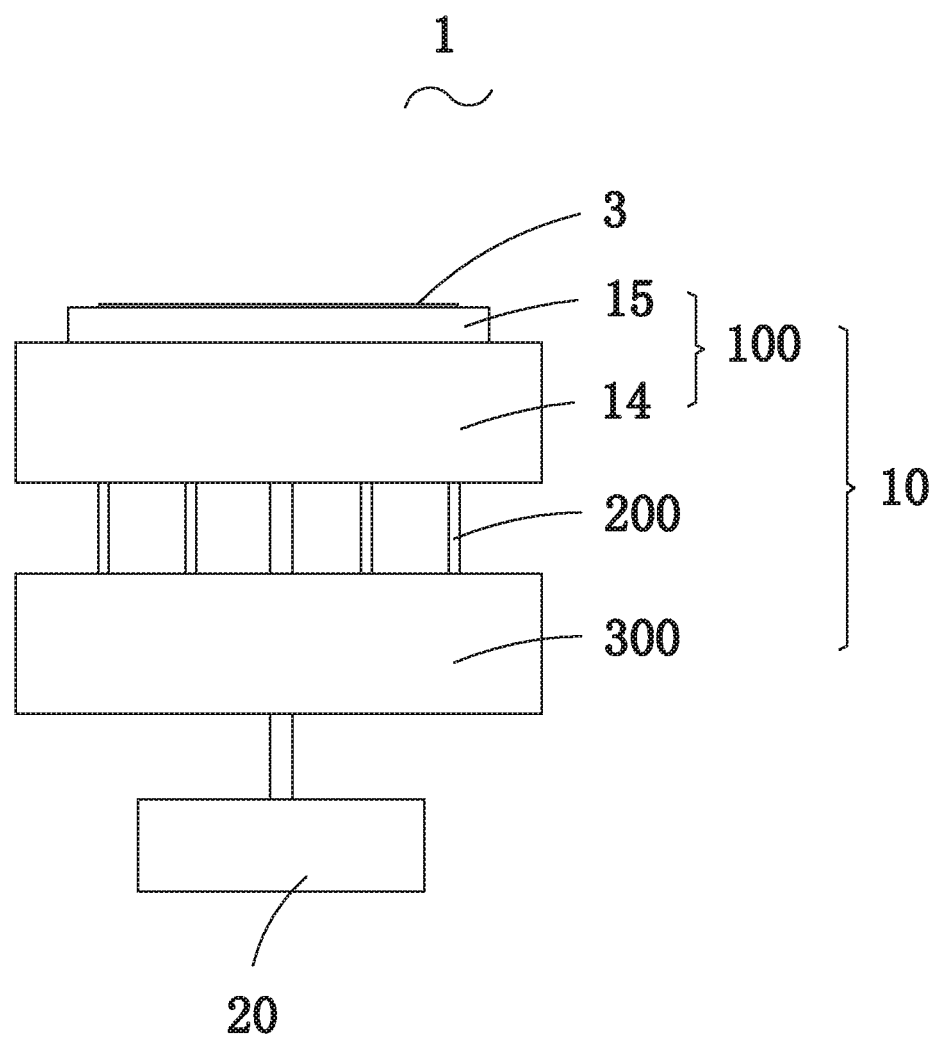
FIG. 1 is a schematic diagram of one exemplary embodiment of a glass product forming apparatus.
Figure 2:
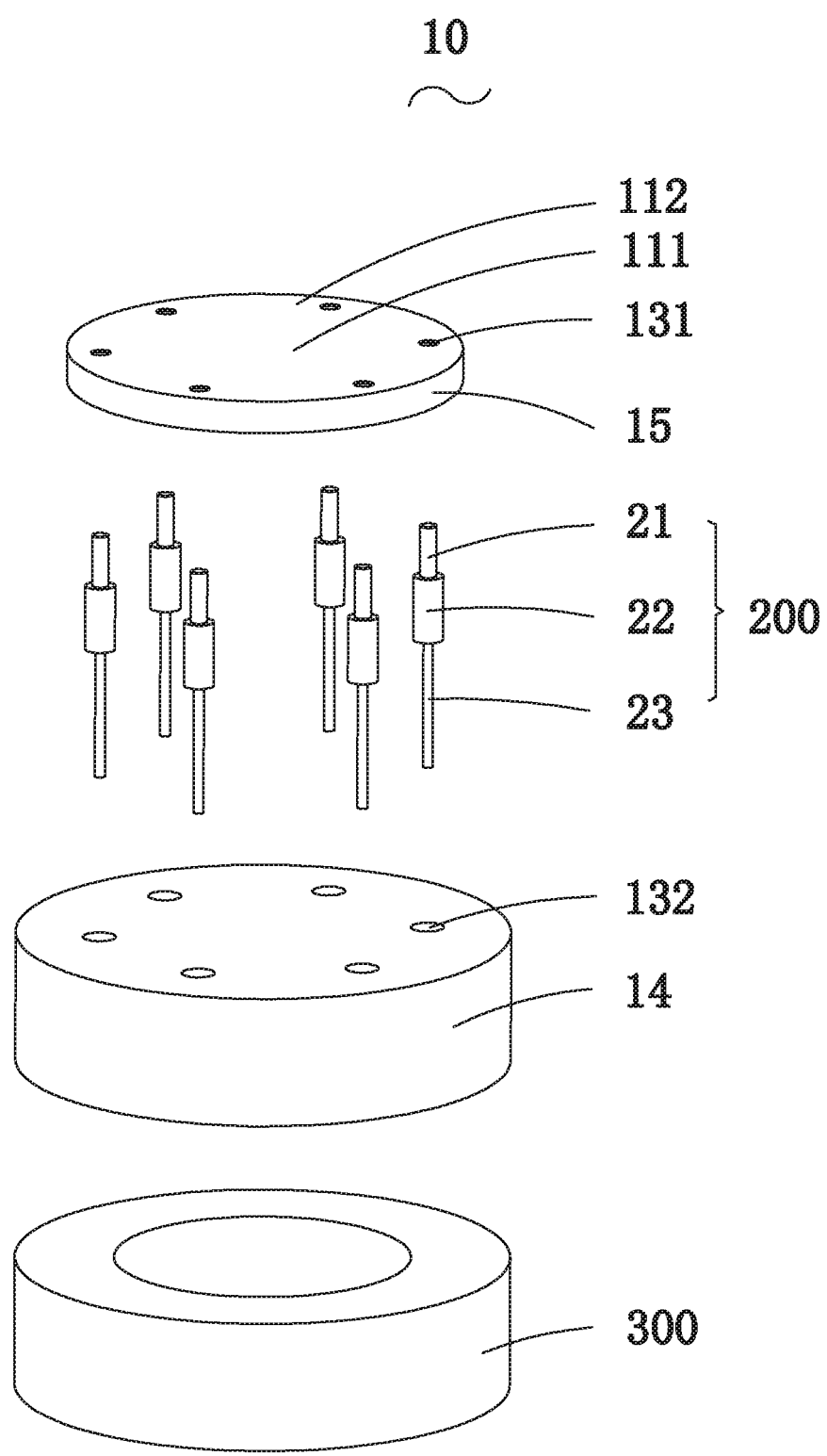
FIG. 2 is an exploded view of one exemplary embodiment of a mold.
Figure 3:
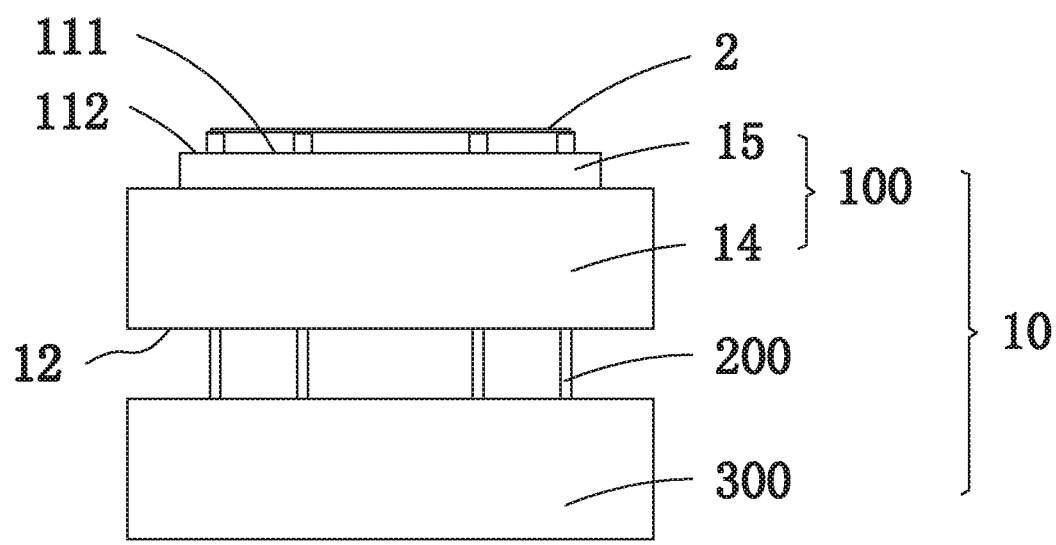
FIG. 3 is a combined diagram of a glass product and the mold, where the glass product is separated from the mold component.
Figure 4:
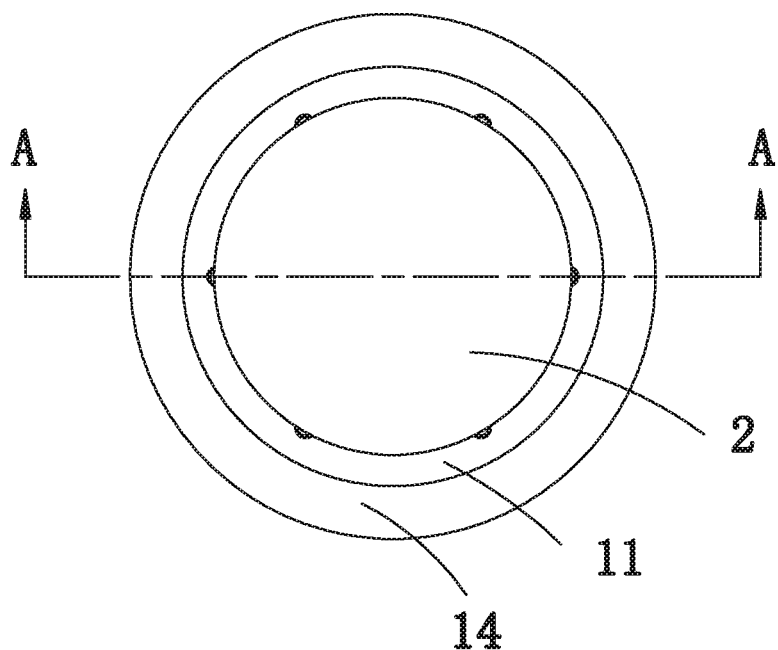
FIG. 4 is a top view of a glass product and the mold in the assembled state where the glass product is separated from the mold component.
Figure 5:
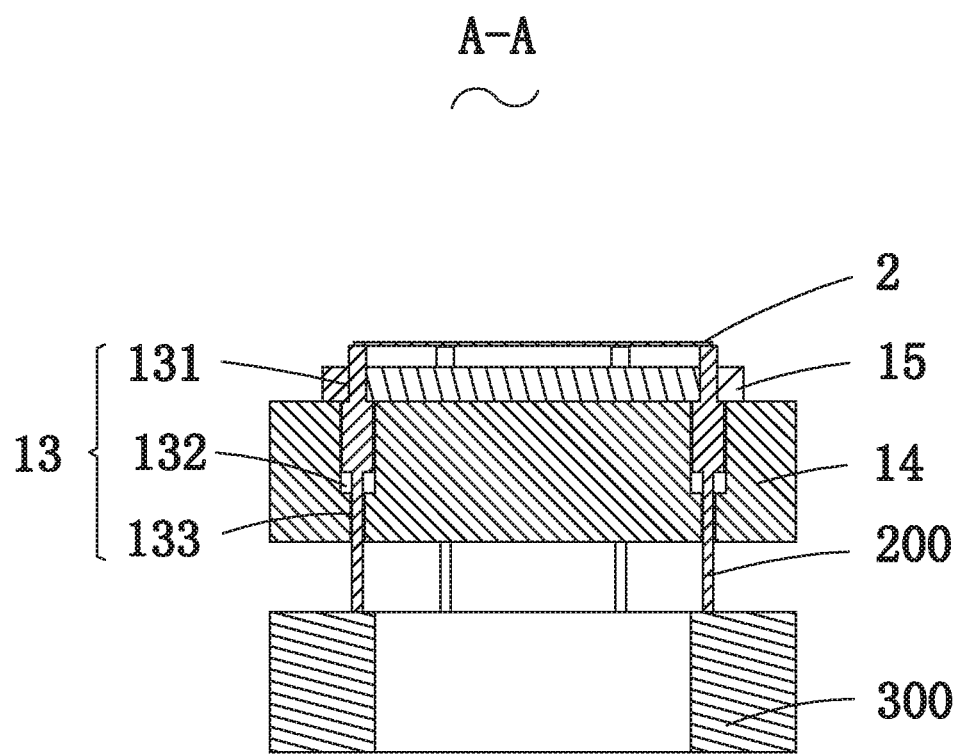
FIG. 5 is a sectional view taken along line A-A of FIG. 4.
Figure 6:
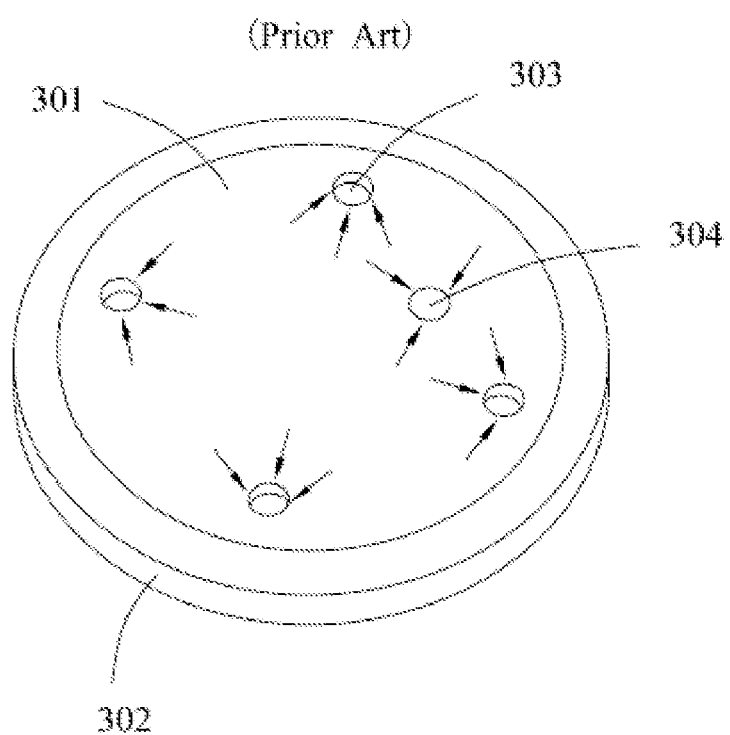
FIG. 6 is a schematic diagram of a glass product and a mold in a prior art.
Figure 7:
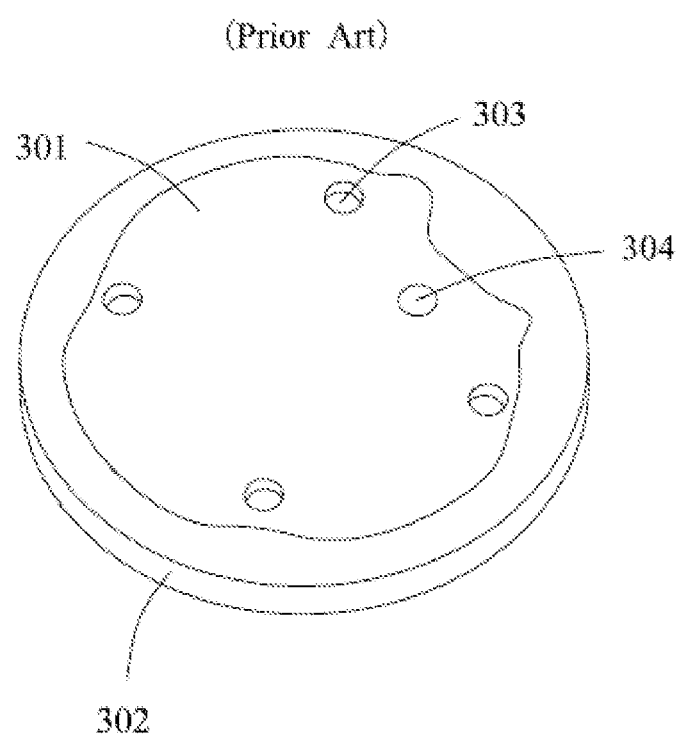
FIG. 7 is a diagrammatic view of the deformation of the glass product due to uneven heat distribution of FIG. 6.
Figure 8:
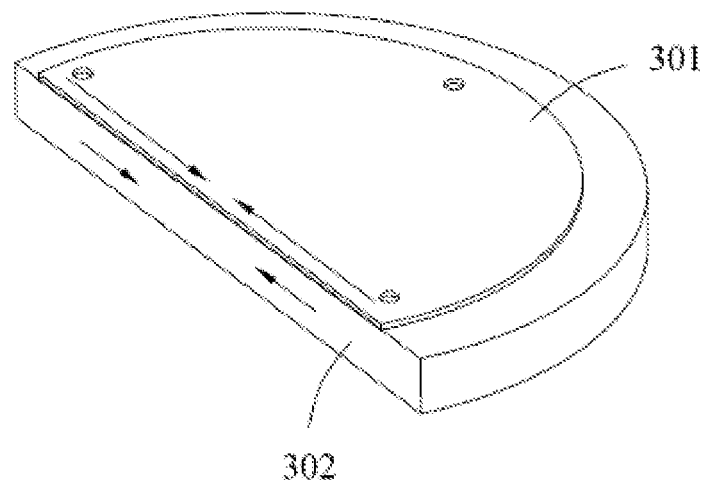
FIG. 8 is a diagrammatic view of the glass product and the mold being contracted of FIG. 6.
Figure 9:
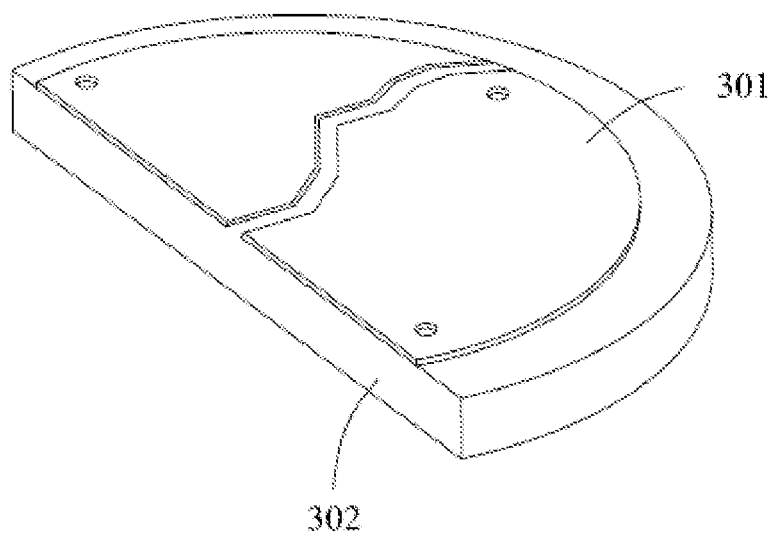
FIG. 9 is a diagrammatic view of the broken glass product due to contraction difference of FIG. 6.

The disclosure is described in detail below in combination with FIGS. 1 to 5.

As shown in FIGS. 1-5, an embodiment of the disclosure provides a glass product forming apparatus 1 including a mold 10 and a driving mechanism 20. The mold 10 includes a mold component 100, a plurality of ejector pins 200 and a stop block 300. The mold component 100 has a molding surface 11 for forming a glass product 3 which includes a molding area 111 and a blank area 112 surrounding the molding area 111, and a bottom surface 12 disposed opposite to the molding surface 11. The mold component 100 defines a plurality of through holes 13 passing through the molding surface 11 and the bottom surface 12 and the plurality of through holes 13 are spaced and surround the edges of the molding area 111. Each ejector pin passes movably through one corresponding through hole and are configured to separate the glass product 3 from the mold component 100. The stop block 300 for forming a stop on the plurality of ejector pins 200 disposed on one side of the bottom surface 12. The driving mechanism 20 is configured to drive the mold component 100 to move toward or away from the stop block 300. The glass product forming apparatus 1 can separate the glass product 3 from the mold component 100 by using the combination of the ejector pins 200 together with the stop block 300, so there is no need to add any additional power source. Furthermore, the ejection process of the ejector pins 200 are controlled by a force piston with high control accuracy.

A glass substrate 2 is formed into glass product 3 in the mold 10, when a temperature of the glass product 3 drops to a glass transition temperature, the driving mechanism 20 drive the mold component 100 to move toward the stop block 300. Meanwhile, the ejector pins 200 move away from the stop block 300 due to the limit of the stop block 300, and the ejector pins 200 protrude from the molding surface 11 and push the glass product 3 away from the mold 10. In this way, the glass product 3 does not contact the molding surface 11 during the cooling process, which eliminates the influence caused by the difference in the thermal expansion between the glass product 3 and the mold 10, thus making the cooling of the glass product 3 more uniform. Furthermore, because the glass product 3 does not contact the molding surface 11, any features that are present at the mold component 100 won't be able to stop the natural shrinkage of the glass product 3, and the quality of the glass product 3 is assured. Besides, the glass product 3 is separated from the mold 10 before the glass product 3 is fully cooled down, thus the mold 10 can mold the next glass substrate 2, which can greatly increase production efficiency and shorten the cycle time during production. In particular, the glass product 3 can be removed from the mold 10 at any time from when the ejector pins 200 push out the glass product 3 to when the glass product 3 is completely cooled down.

Specifically, in one exemplary embodiment, the outline of the glass substrate 2 is circular.

Specifically, the outline of the molding area 111 is circular. The plurality of ejector pins 200 spaced and surround the edges of the molding area 111. In at least one exemplary embodiment, mold 10 includes five ejector pins 200 disposed surrounding the molding area 111, a distance between each two neighbouring ejector pins 200 is the same. Five ejector pins act on a glass product 3, thus the glass product 3 has more stress points and force exerted on the glass product 3 is more uniform. The glass product 3 can be smoothly separated from the mold component 100 and stably located on the ejector pins 200. Understandably, a number of ejector pins 200 is changeable according to the actual situation, for example, four, six and seven or more other numbers are also possible, and a number of through holes 13 corresponds to the number of ejector pins 200.

Specifically, because an end surface of the ejector pins 200 in contact with the glass product 3 is flat and smooth, no indentation will be left on the glass product 3 during an ejection process.

Preferably, each ejector pin includes a first portion 21, a second portion 22 and a third portion 23 connected to the first portion 21 through the second portion 22; a diameter of the second portion 22 is greater than that of the third portion 23 which can prevent ejector pins 200 from detaching from the mold component 100, and the diameter of the second portion 22 is greater than that of the first portion 21 which can limit the ejection stroke of the ejector pins 200. Each through hole includes a first hole 131 extending from the molding surface 11 toward the bottom surface 12, a second hole 132 extending from the first hole 131 toward the bottom surface 12 and a third hole 133 extending from the second hole 132 toward the bottom surface 12. The first portion 21 corresponds to the first hole 131, the second portion 22 corresponds to the second hole 132, and the third portion 23 corresponds to the third hole 133. Setting the ejector pins 200 in a three-stage structure can not only limit the ejection stroke of the ejector pins 200, but also prevent the ejector pins 200 from detaching from the mold component 100. In the initial state, the ejector pins 200 are disengaged and are hanging loosely from the mold component 100 and the stop block 300 touching the ejector pins 200, thus the surface of the stop block 300 facing the mold component 100 serves as the surface against which the ejector pins 200 are pushed. In this way, the mold component 100, the ejector pins 200, and the stop block 300 occupy less space in the glass product forming apparatus 1, and the overall structure of the glass product forming apparatus 1 is more compact.

Preferably, the mold component 100 further comprises a mold core 14 and a mold insert 15 disposed on one side of the mold core 14 away from the stop block 300. The molding surface 11 is defined on one side of the surface of the mold insert 15 away from the mold core 14, and the bottom surface 12 is defined on one side of the surface of the mold core 14 away from the mold insert 15. The second hole 132 and the third hole 133 are defined on the mold core 14 and the second hole 132 is connected to the third hole 133 to pass through the mold core 14, and the first hole 131 is defined on the mold insert 15. And a chamfer is formed on a flange of the first hole 131 to avoid the sharp flange of the first hole 131 from damaging the glass product 3.

The disclosure also provides a method of processing a glass product, the method including:

providing the aforesaid glass product forming apparatus 1 and a glass substrate 2;

placing the glass substrate 2 in the mold 10 to form a glass product 3 at a temperature higher than the glass transition temperature; when a temperature of the glass product 3 drops to a glass transition temperature, the ejector pins 200 protrude from the molding surface 11 and push out the glass product 3 to separate the glass product 3 from the glass product 3 apparatus; and cooling the glass product 3.

The glass transition temperature refers to a temperature at which the glass can transform from a highly viscous state to a glass state or from a glass state to a highly viscous state. The glass product 3 is in a highly viscous state in an environment higher than the glass transition temperature, at this time, the glass product 3 is easily deformed in the presence of an external force. The glass product 3 is in a glass state in the environment lower than the glass transition temperature, at this time, the glass product 3 has certain rigidity, it is difficult to deform even in the presence of an external force. Therefore, only when the temperature of the glass product 3 drops below the glass transition temperature, can the ejector pins 200 be driven to push out the glass product 3, so as to avoid the deformation of the glass product 3 caused by the ejector pins 200 being pushed.

After the step of cooling the glass product 3, the method further includes a step of moving the mold component 100 away from the stop block 300 through the driving mechanism 20, and an end of the ejector pins 200 far from the stop block 300 is retracted into the mold component 100.

Based on the method of the disclosure, when the temperature of the glass product 3 drops to a glass transition temperature value, the glass product 3 is quickly and steadily separated from the mold 10, thereby eliminating the various potential factors that cause the glass product 3 after molding and before cooling to become defective due to the contact between the glass product 3 and the mold component 100. The molded glass product 3 is completely independent of the mold component 100, so the glass product 3 is cooled more uniformly and the quality of the glass product 3 is assured. Besides, since the molded glass product 3 is completely independent of the mold component 100, the cooling speed of the glass product 3 is accelerated, which can shorten the production cycle of the glass product 3.

The above embodiments are only the preferred embodiments of the present invention, and do not limit the scope of the present invention. A person skilled in the art may make various other corresponding changes and deformations based on the described technical solutions and concepts. And all such changes and deformations shall also fall within the scope of the present invention.

The invention claimed is:

1. A glass product forming apparatus comprising:
   a mold comprising:
      a mold component having:
         a molding surface for forming a glass product;
         a bottom surface disposed opposite to the molding surface; and
         a plurality of through holes passing through the molding surface and the bottom surface;
      a plurality of ejector pins configured to separate the glass product from the mold component, the plurality of ejector pins disengaged and hanging loosely in the plurality of through holes respectively;
      a stop block for forming a stop on the plurality of ejector pins disposed on one side of the bottom surface; and
   a driving mechanism configured to drive the mold component to move toward or away from the stop block, wherein
   each ejector pin comprises a first portion, a second portion and a third portion connected to the first portion through the second portion; a diameter of the second portion is greater than that of the third portion, the diameter of the second portion is greater than that of the first portion; each through hole comprises a first hole extending from the molding surface toward the bottom surface, a second hole extending from the first hole toward the bottom surface and a third hole extending from the second hole toward the bottom surface; the first portion corresponds to the first hole, the second portion corresponds to the second hole, the third portion corresponds to the third hole.

2. The glass product forming apparatus of claim 1, wherein the mold component further comprises a mold core and a mold insert disposed on one side of the mold core away from the stop block; the molding surface is defined on one side of the surface of the mold insert away from the mold core, the bottom surface is defined on one side of the surface of the mold core away from the mold insert; the second hole and the third hole are defined on the mold core and the second hole is connected to the third hole to pass through the mold core, and the first hole is defined on the mold insert.

3. The glass product forming apparatus of claim 1, wherein the molding surface comprises a molding area and a blank area surrounding the molding area, and the plurality of through holes are spaced and surround the edges of the molding area.

4. A method of processing a glass product, comprising:
   providing a glass product forming apparatus of claim 1 and a glass substrate;
   placing the glass substrate in the mold to form a glass product;
   when a temperature of the glass product drops to a glass transition temperature, the ejector pins protrude from the molding surface and push the glass product away from the mold; and
   cooling the glass product.

5. The method of claim 4, wherein after the step of cooling the glass product, the method further comprises a step of moving the mold component away from the stop block through the driving mechanism; an end of the each ejector pin far from the stop block is retracted into the mold component.

6. The method of claim 4, wherein the mold component further comprises a mold core and a mold insert disposed on one side of the mold core away from the stop block; the molding surface is defined on one side of the surface of the mold insert away from the mold core, the bottom surface is defined on one side of the surface of the mold core away from the mold insert; the second hole and the third hole are defined on the mold core and the second hole is connected to the third hole to pass through the mold core, and the first hole is defined on the mold insert.

7. The method of claim 4, wherein the molding surface comprises a molding area and a blank area surrounding the molding area, and the plurality of through holes are spaced and surround the edges of the molding area.

\* \* \* \* \*